(12) United States Patent
Iwabuchi et al.

(10) Patent No.: US 7,681,217 B2
(45) Date of Patent: Mar. 16, 2010

(54) VIDEO SYSTEM AND VIDEO SELECTION METHOD THEREOF

(75) Inventors: Kazunori Iwabuchi, Yokohama (JP); Norikazu Sasaki, Ebina (JP)

(73) Assignee: Hitachi, Ltd., Tokyo (JP)

( * ) Notice: Subject to any disclaimer, the term of this patent is extended or adjusted under 35 U.S.C. 154(b) by 428 days.

(21) Appl. No.: 11/649,426

(22) Filed: Jan. 3, 2007

(65) Prior Publication Data

US 2007/0192796 A1  Aug. 16, 2007

(30) Foreign Application Priority Data

Jan. 4, 2006  (JP)  .............................. 2006-000026

(51) Int. Cl.
*H04N 5/445* (2006.01)
(52) U.S. Cl. .......................................... 725/46; 725/51
(58) Field of Classification Search ...................... 725/9, 725/14, 46, 58, 100, 131, 34, 51; 345/327; 715/721
See application file for complete search history.

(56) References Cited

U.S. PATENT DOCUMENTS

| | | | | |
|---|---|---|---|---|
| 6,005,562 A | * | 12/1999 | Shiga et al. | 715/721 |
| 2003/0208756 A1 | * | 11/2003 | Macrae et al. | 725/34 |
| 2004/0049787 A1 | * | 3/2004 | Maissel et al. | 725/46 |
| 2006/0123448 A1 | * | 6/2006 | Ma et al. | 725/51 |

FOREIGN PATENT DOCUMENTS

JP   2002-369090   12/2002

* cited by examiner

*Primary Examiner*—Joseph P Hirl
*Assistant Examiner*—An Nguyen
(74) *Attorney, Agent, or Firm*—Townsend and Townsend and Crew LLP (57) ABSTRACT

A video information system which displays or records broadcast video information records an operation history of the video information system, and, when video information is newly reproduced and displayed or newly recorded, generates user presence information from the operation history and program information of broadcast video information and selects video information to be displayed or recorded based on the user preference information.

22 Claims, 6 Drawing Sheets

42 ELECTRONIC PROGRAM LIST INFORMATION

| DATE | CHANNEL NUMBER | EVENT ID | PROGRAM NAME | GENRE | PERFORMER | PROGRAM DESCRIPTION |
|---|---|---|---|---|---|---|
|  |  |  |  |  |  |  |
|  |  |  |  |  |  |  |

SELECTION INFORMATION 41

| DATE | CHANNEL NUMBER | EVENT ID |
|---|---|---|
|  |  |  |
|  |  |  |

81 ELECTRONIC PROGRAM LIST
82 RECOMMENDED PROGRAM INDICATOR

|  | ABC TV | DEF TV | GHI TV |
|---|---|---|---|
| 12:00 |  | ☆ |  |

FIG. 9

RECORDING RESERVATION — 90

| | | |
|---|---|---|
| RECORDING CHANNEL | ch.011 | ~91 |
| PROGRAM INFORMATION | LIVE BASEBALL | ~92 |
| START DATE AND TIME | 2006/04/01 19:30 | ~93 |
| END DATE AND TIME | 2006/04/01 21:30 | ~94 |

95 RESERVE    96 CANCEL

VIDEO SYSTEM AND VIDEO SELECTION METHOD THEREOF

INCORPORATION BY REFERENCE

This application claims priority from Japanese Patent Application JP 2006-000026, filed on Jan. 4, 2006, the content of which is hereby incorporated by reference into this application.

BACKGROUND OF THE INVENTION

The present invention relates to a video recording/reproducing system for recording and reproducing moving image information transmitted by a broadcast, telecommunication, or the like, and particularly to a video recording/reproducing system for easily realizing program recommendation, automatic station selection, and automatic recording conforming to a user preference.

In recent years, the number of channels of broadcast programs is increased. Such channels include, for example, terrestrial digital broadcasting, BS digital broadcasting, and 110 CS broadcasting. Although user preferences are various, it is highly likely that a program which a user wants to watch is being broadcast on any of channels. Conventionally, EPG (Electronic Program Guide) is provided as operational information to select a broadcast program to be viewed conforming to a preference from many channels. A user can get grip on programs being broadcast at present and broadcast programs for a week from now using EPG, and selects a broadcast program to be viewed or recorded based on such information.

As a data amount of EPG is increased due to the increased number of channels of broadcast programs, there occurs a problem that EPG's data can not be displayed on a display screen at a time and the like. Therefore, a broadcast receiver is devised which acquires user preference information from an operational state of a remote control or the like and presents a program recommended to a user for viewing based on this preference information and program information as disclosed in JP-A-2002-369090.

SUMMARY OF THE INVENTION

According to the technology disclosed in JP-A-2002-369090, a program recommendation function in a broadcast receiver and a video recording/reproducing device in a case where a plurality of tuners exist is not considered. Additionally, it is also not considered that, when the number of channels or the number of programs is increased, electronic program list information itself requires a large capacity and operation of the program recommendation function becomes complex.

The present invention allows a program which the user wants to watch to be properly found and displayed as a recommended program, and provides a television or a video recording/reproducing system which performs automatic viewing and automatic recording of the recommended program so that the user's effort is reduced and the user's limited time is effectively used.

In the video recording/reproducing system, program recommendation conforming to the user preference is realized by providing a recommended program generation section and thereby retrieving user preference information and converting it to a numeric value.

Specifically, a video recording/reproducing system according to the present invention includes a broadcast receiving tuner, a recording control section for recording a broadcast program received from the broadcast receiving tuner, an electronic program list information storage section for storing program information of a broadcast program received from the broadcast receiving tuner, a program list display section for displaying the program information, station selection information storage section for recording channel selection information of the broadcast receiving tuner selected by a user for viewing, a common noun storage section, and a recommended program generation section for generating recommended program information by acquiring program information from the electronic program list information storage section based on the channel selection information, deleting a common noun from the acquired program information with reference to at least the common noun storage section to obtain user preference information, and extracting program information corresponding to the user preference information from the electronic program list information storage section, wherein program information identified by the recommended program information is displayed with a mark as a program information display or the broadcast program identified by the recommended program information is automatically recorded.

The present invention allows a program which the user wants to watch to be properly found and displayed as a recommended program. In addition, there can be provided a television or a video recording/reproducing system which performs automatic viewing and automatic recording of a recommended program so that the user's effort is reduced and the user's limited time is effectively used.

Other objects, features and advantages of the invention will become apparent from the following description of the embodiments of the invention taken in conjunction with the accompanying drawings.

DESCRIPTION OF THE INVENTION

Hereinafter, embodiments of the present invention will be described with reference to FIGS. 1 to 8.

Figure 1:
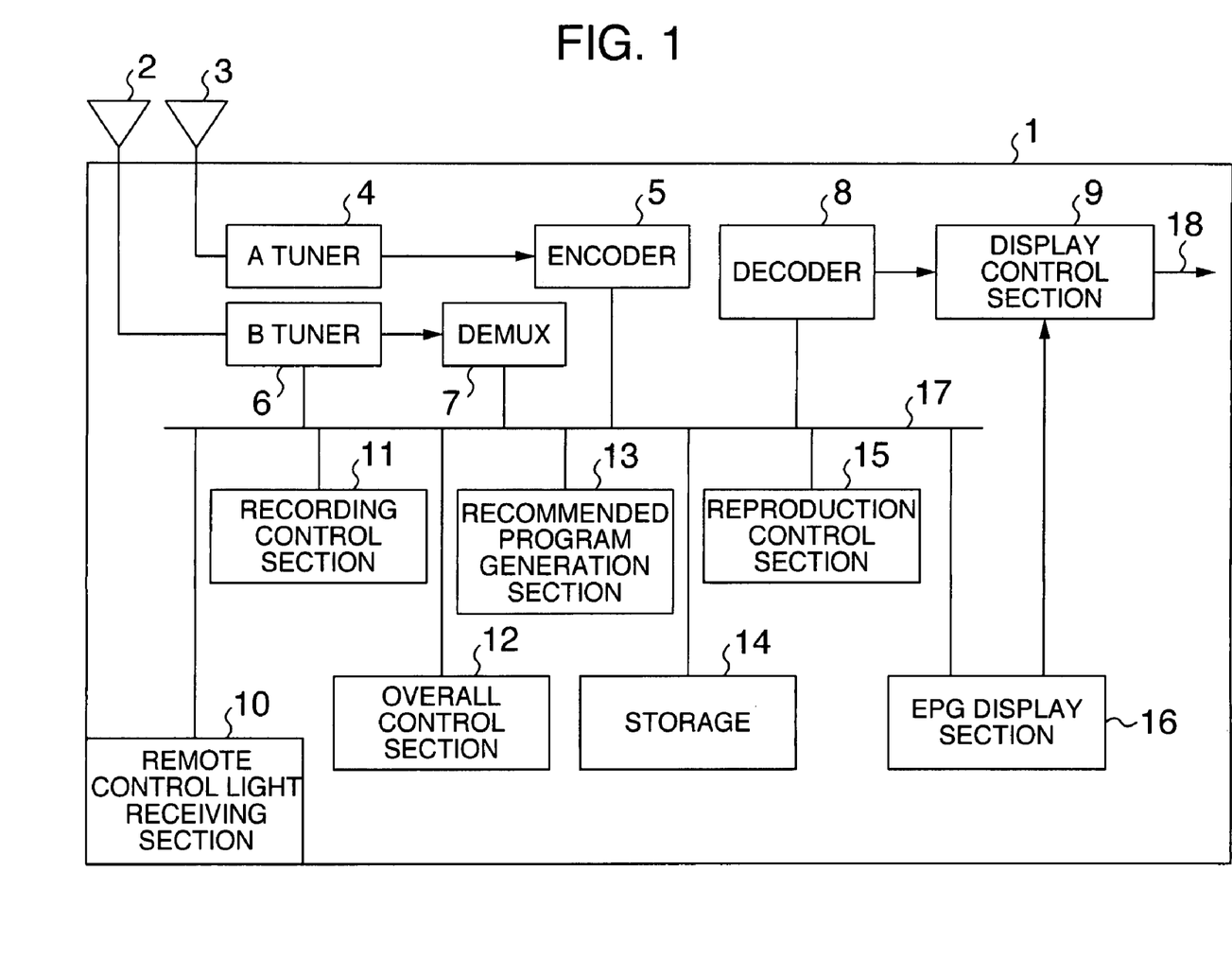
FIG. 1 is a block diagram of a video recording/reproducing system.

FIG. 1 shows a video recording/reproducing system. Reference numeral 1 denotes the video recording/reproducing system, reference numerals 2 and 3 denote antennas, reference numeral 4 denotes an A tuner, reference numeral 5 denotes an encoder, reference numeral 6 denotes a B tuner, reference numeral 7 denotes a DEMUX, reference numeral 8 denotes a decoder, reference numeral 9 denotes a display control section, reference numeral 10 denotes a remote control light receiving section, reference numeral 11 denotes a recording control section, reference numeral 12 denotes an overall control section, reference numeral 13 denotes a recommended program generation section, reference numeral 14 denotes a storage, reference numeral 15 denotes a reproduction control section, reference numeral 16 denotes an EPG display section, reference numeral 17 denotes a system bus, reference numeral 18 denotes a video signal, and reference numeral 21 denotes a remote control.

Figure 2:
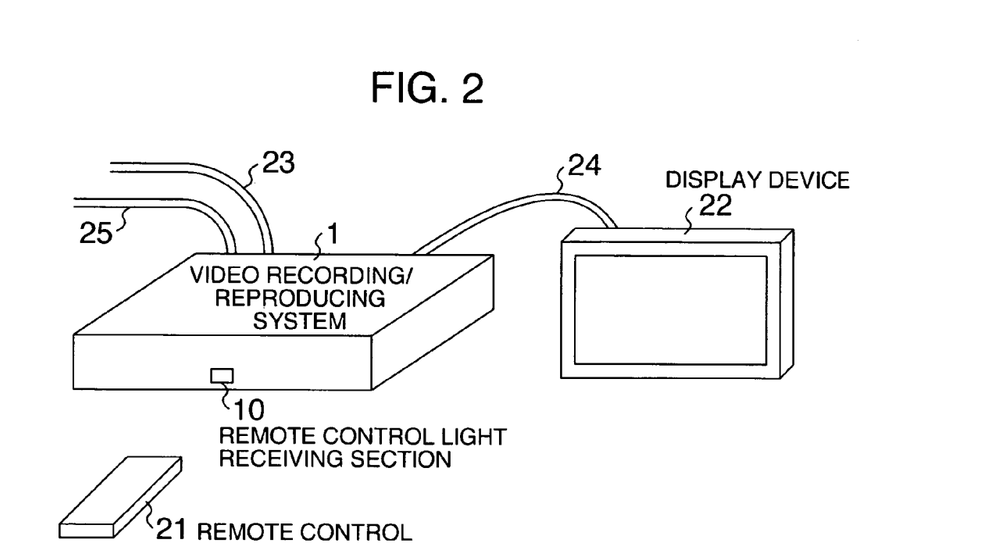
FIG. 2 is an external view of the video recording/reproducing system.

FIG. 2 is an external view of the system. Reference numeral 22 denotes a display device, reference numerals 23 and 25 denote antenna wires, and reference numeral 24 denotes a video cable.

Figure 3:
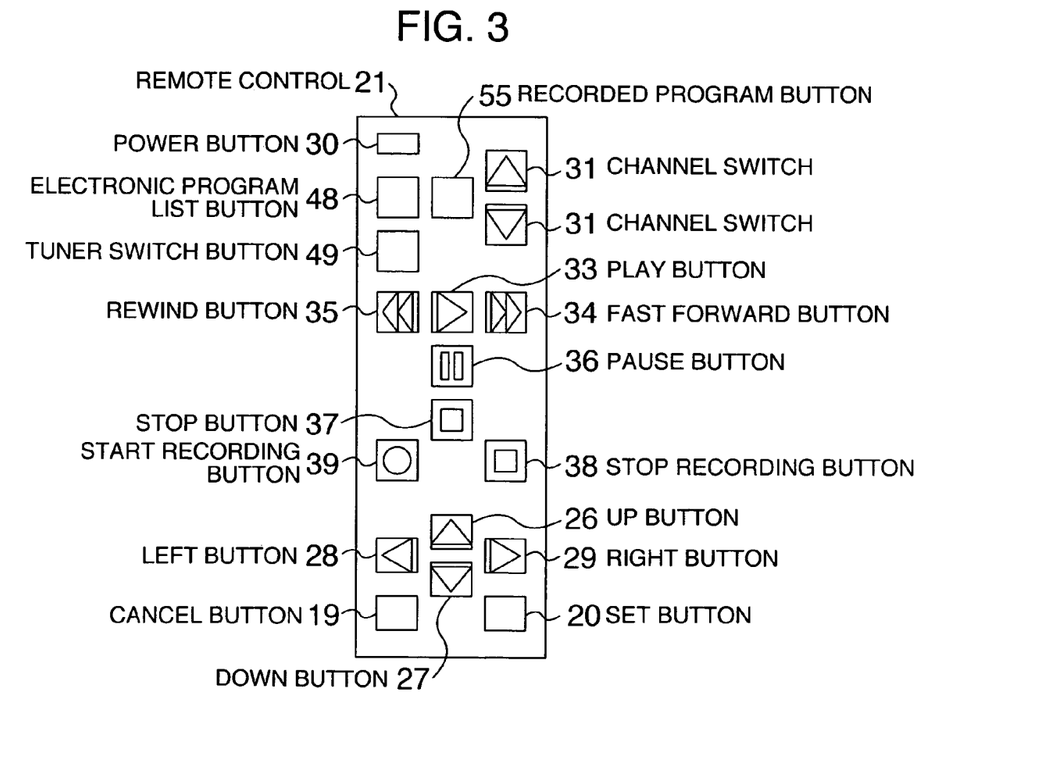
FIG. 3 is an external view of a remote control.

FIG. 3 is an external view of the remote control. Reference numeral 30 denotes a power button, reference numeral 31 denotes a channel switch, reference numeral 33 denotes a play button, reference numeral 34 denotes a fast forward button, reference numeral 35 denotes a rewind button, reference numeral 36 denotes a pause button, reference numeral 37 denotes a stop button, reference numeral 38 denotes a stop recording button, reference numeral 39 denotes a start recording button, reference numeral 48 denotes an electronic program list button, and reference numeral 49 denotes a tuner switch button.

A recording function and a reproducing function in the video recording/reproducing system will be described below with reference to FIGS. 1 to 3.

A user (operator) pushes the power button 30 using the remote control 21 to turn on/off the power of the video recording/reproducing system. The power is turned on, and then the overall control section 12 of FIG. 1 receives an operation of the remote control by the user and controls overall control. For example, the user pushes the tuner switch button 49 of FIG. 3 so that video on either the A tuner 4 or the B tuner 6 is selected. Then, the user selects a station by operating the channel switch button 31 to find a program which the user wants to watch.

If the user operates the start recording button 39 of FIG. 3 here, the overall control section 12 issues a control instruction to the recording control section 11 and thereby starts recording, and a program to be recorded is stored in the storage 14. If the user pushes the stop recording button 38 here, the recording is stopped. When the play button 33 is pushed by the user's operation, the overall control section 12 issues a control instruction to the reproduction control section 15 and thereby starts reproduction of the program recorded in the storage 14. When the reproduction is started, video data of the recorded program is sent from the storage 14 to the decoder 8, and the video data, which has been compressed in MPEG-2 or the like, is decompressed and sent to the display control section 9. The video data sent from the decoder 8 is outputted as a video signal 18 by the display control section 9 and displayed on the display device 22 of FIG. 2. The user can control reproduction using the fast forward button 34, the rewind button 35, the pause button 36, and the stop button 37 of FIG. 3.

Further, the user can display an electronic program list on the device 22 by pushing the electronic program list button 48 on the remote control of FIG. 3. In this case, the overall control section 12 sends a control instruction to the EPG display section 16, and the EPG display section 16 displays electronic program list information sent from the A tuner 4 or the B tuner 6 on the display control section 9.

Figure 4:
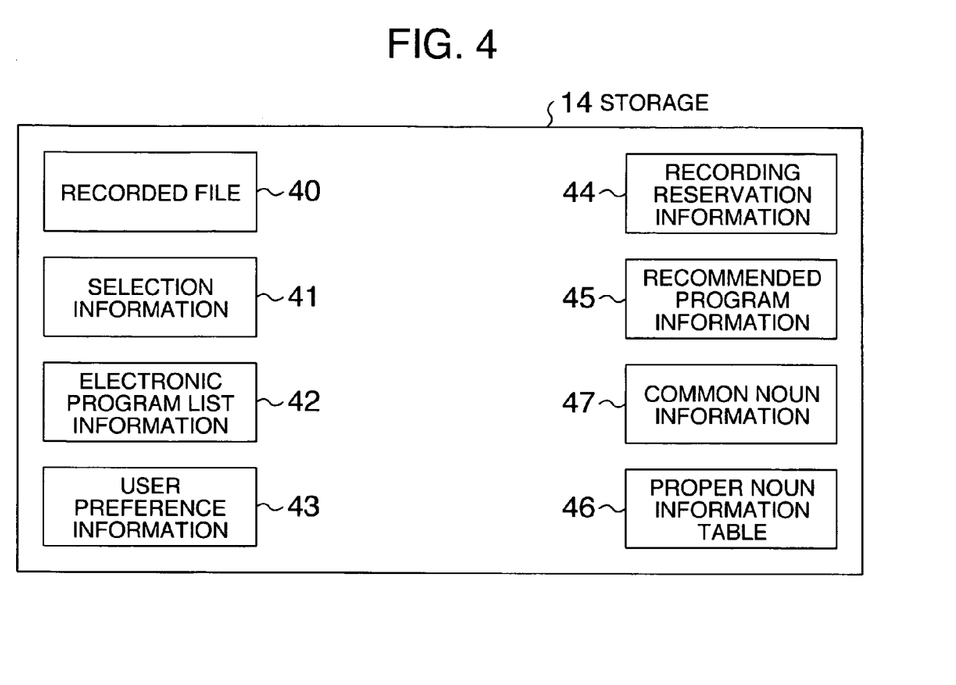
FIG. 4 is information stored in a storage 14.

Details of a recorded program will next be described with reference to FIG. 4. A recorded program is stored in the storage 14 in which reference numeral 40 denotes a recorded file, reference numeral 41 denotes station selection information, reference numeral 42 denotes electronic program list information, reference numeral 43 denotes user preference information, reference numeral 44 denotes recording reservation information, reference numeral 45 denotes recommended program information, and reference numeral 47 denotes common noun information.

In the storage 14, the recorded program stored during program recording as described with reference to FIGS. 1 to 3 is stored as the recorded file 40. In addition, an electronic program list is stored as the electronic program list information 42. Source data of the electronic program list which is displayed when the electronic program list display button 48 is pushed as previously mentioned is this electronic program list information 42. Further, as described later, the station selection information 41, the user preference information 43, the recording reservation information 44, the recommended program information 45, the common noun information 47, and the like are also stored in the storage 14. The common noun information is a table which previously stores general common noun words that are not proper nouns.

Figure 5:
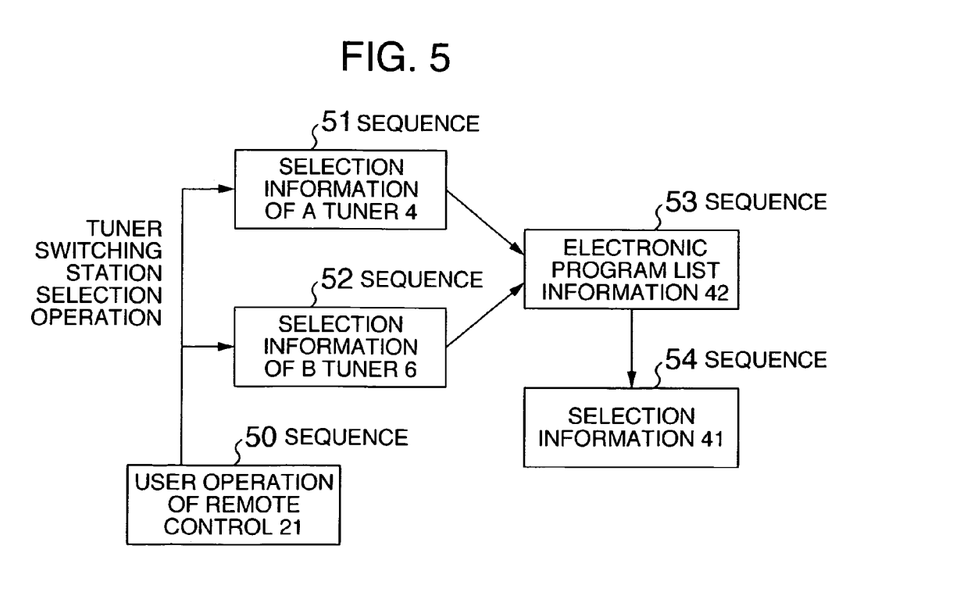
FIG. 5 is a diagram of generation of station selection information 41.

FIG. 5 is a diagram which shows a technique for generating the station selection information 41. The overall control section 12 of FIG. 1 retrieves station selection information of the A tuner 4 of sequence 51 and station selection information of the B tuner 6 of sequence 52 respectively according to tuner switching and station selection by the user's operation on the remote control 21 in sequence 50, refers to the electronic program list information 42 in sequence 53, and generates the station selection information 41 in sequence 54.

Figure 6:
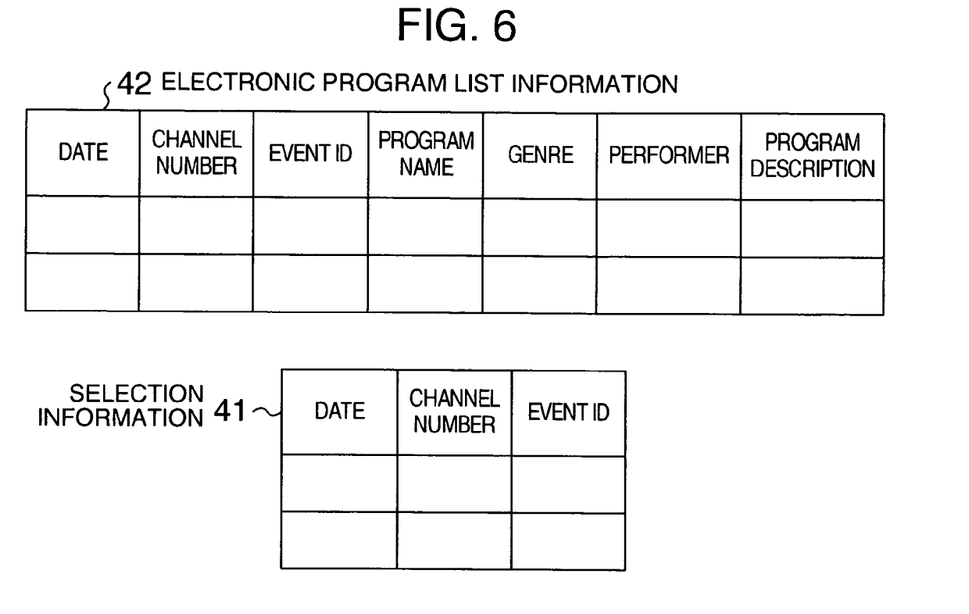
FIG. 6 is a diagram which shows an example of electronic program list information 42 and station selection information 41.

FIG. 6 shows an example of the electronic program list information 42 and the station selection information 41. The electronic program list information 42 is a table which stores a date, a channel number, an event ID (a unique number for each program), a program name, a genre, a performer, a program description (text in which a program content is described), and the like. The station selection information 41 is a table which stores a data, a channel number, and an event ID.

The technique for generating the station selection information 41 just as described with reference to FIG. 5 is to retrieve minimum required information from the electronic program list information 42 according to tuner selection and station channel selection by the user's operation and to generate a table of the station selection information 41. The station selection information 41 is a table which is extended downward each time the user selects a station.

While user preference information is made from information of user's operation as described above, station selection information may be generated by extracting a broadcast date, a channel number, and an event ID from a viewing history about already recorded broadcast programs.

Figure 7:
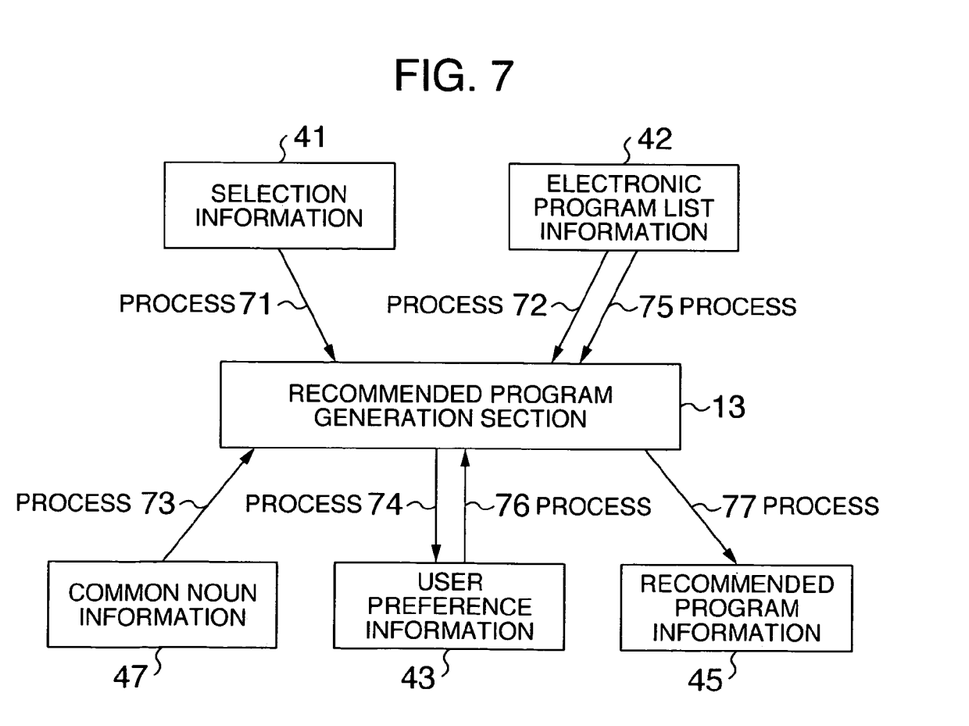
FIG. 7 is a diagram which illustrates a technique of program recommendation.

FIG. 7 is a diagram which illustrates a technique of program recommendation. In process 71, the recommendation program generation section 13 of FIG. 1 reads out the station selection information 41. Then, in process 72, detailed information of a program which a user selected by station selection and watched is retrieved by reading out and referring to the electronic program list information 42. The information extracted from the electronic program list information 42 based on the station selection information 41 has contained information which indicates a user preference such as a performer and a program description as shown in the electric program list information 42 illustrated in FIG. 6. However, since such information is redundant, a date, a channel number, and an event ID are deleted at first, and then, in process 73, the common noun information 47 is retrieved and such a common noun is deleted from performer information and program description information. Although, as a result of this, the performer information and the program description information have blank and incomplete data, blanks and meaningless characters and strings are deleted in process 74 so that proper nouns remain in these information. Then, lists of the remaining genre information and proper nouns information are stored in the storage 14 as a set of user preference information 43.

The recommended program generation section 13 retrieves the user preference information 43 in process 76, and compares the electronic program list information 42 with the user preference information 43 to assign scores to all program information according to whether or not each program information is close to the user preference information in process 75. In process 77, high-scoring information is stored as recommended program information 45. The recommended program information 45 is a table having a similar format to the station selection information 41 shown in FIG. 6, and allows details information of a recommended program to be retrieved with reference to the electronic program list information 42.

Figure 8:
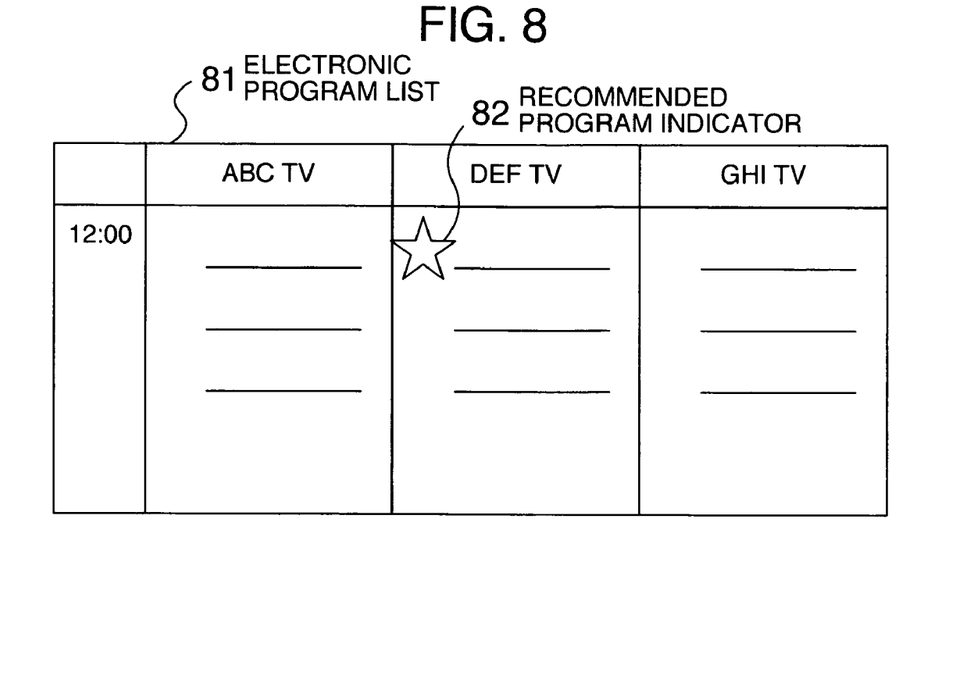
FIG. 8 is a diagram which illustrates a display method of a recommended program.

FIG. 8 illustrates a technique for displaying a recommended program. Reference numeral 81 denotes an electronic program list, and reference numeral 82 denotes a recommended program indicator. When an electronic program list is displayed on a screen by the EPG display section 16 shown in FIG. 1, it is displayed as the electronic program list 81 as shown in FIG. 8. In this list, each broadcast station name is shown on the horizontal axis and program information for each time is shown on the vertical axis. The recommended program indicator 82 is displayed if there is a recommended program, using the recommended program information 45 which is generated by the recommended program generation section 13 described with reference to FIG. 7. In FIG. 8, a recommended program can be indicated with an asterisk added thereto such that a user can find it instantly.

Although, in the above description, the number of tuners appears to be limited to two in the present embodiment, it is obvious that station selection information is handled as one set of station selection information even if there are more than two tuners. In addition, although there is only one kind of electronic program list information in the above description, different electronic program list information for each tuner can also be implemented by switching electronic program list information to be referred to.

The user preference information 43 will now be described in detail. In the description of FIG. 7, the user preference information 43 is a set of lists of genre information and proper nouns information. In this instance, the genre information is replaced with numerals first. In addition, each proper noun information is assigned with a number that is a power of two each time proper noun information occurs, and a proper noun information table 46 which is a table of the assigned numbers and the proper nouns is generated. In the proper noun information table 46, proper noun numbers represented as powers of two such as 1, 2, 4, 8, and proper nouns are described.

Accordingly, the user preference information 43 is rearranged with reference to the proper noun information table 46. At this time, in the user preference information 43, a genre information number is stored, and, for each proper noun, "1" is stored if it exists, and "0" is stored if it does not exist. In this way, the user preference information 43 can be converted to a numeric value. For example, when user preference information 43 has a genre information number "0001" in binary, and proper nouns whose number is the zero power of two, the square of two, and the cube of two on the proper noun information table respectively, the user preference information 43 can be uniquely converted to a numeric value, i.e., the genre information number: 0001 and proper noun information: 1101. Although, in this example, the genre number consists of 4 bits and there are only four proper nouns whose numbers are from the zero power of two to the cube of two in the proper noun information, proper noun information preferably has an enough large size since it depends on a user preference.

According to this embodiment, user preference information 43 can be handled as a unique numeric value, and therefore operation for generating recommended program information 45 from electronic program list information 42 is significantly simplified. As a result, a program close to a unique numeric value of user preference information 43 can be found for a short time even if there is program information which is detailed and covers many channels.

Although, in the above described example, a recommended program conforming to a user preference is displayed on EPG using the recommended program information 45 generated by the recommended program generation section 13, a program recommended using the recommended program information 45 may be automatically recorded without intervention of user's operation. Then, the recommended program indicator 82 may be displayed using a list of already recorded programs or the like. Thereby, recording conforming to the user preference is automatically performed, and an accident that the user forgets to reserve a recording or the like is prevented.

In addition, the overall control section 12 provides a mode in which, using the recommended program information 45 generated by the recommended program generation section 13, the overall control section 12 of FIG. 1 controls the A tuner 4 or the B tuner 6 to automatically change a channel to a channel of a recommended program without intervention of user's operation. In operation of this operation mode, the channel is automatically switched to a channel of a program which a user habitually watches even if the user does not operate the remote control. As a result, automatic viewing conforming to a user preference for each program unit is allowed, and, for example, a function which automatically displays a news program at the time when the news program is to be broadcast can be provided for a user who often watches news.

As described above, in a television or video recording/reproducing system having a plurality of tuners, a user preference can be automatically memorized. Additionally, for example, although a program preferred by a user is not always displayed when a television has just been turned on, a television to which the present invention is applied is considered to be used as a method to automatically select a station of a broadcast program conforming to a user preference in each program unit so that the user does not forget to view it, or as an automatic recording function using user preference information based on station selection by a user.

Figure 9:
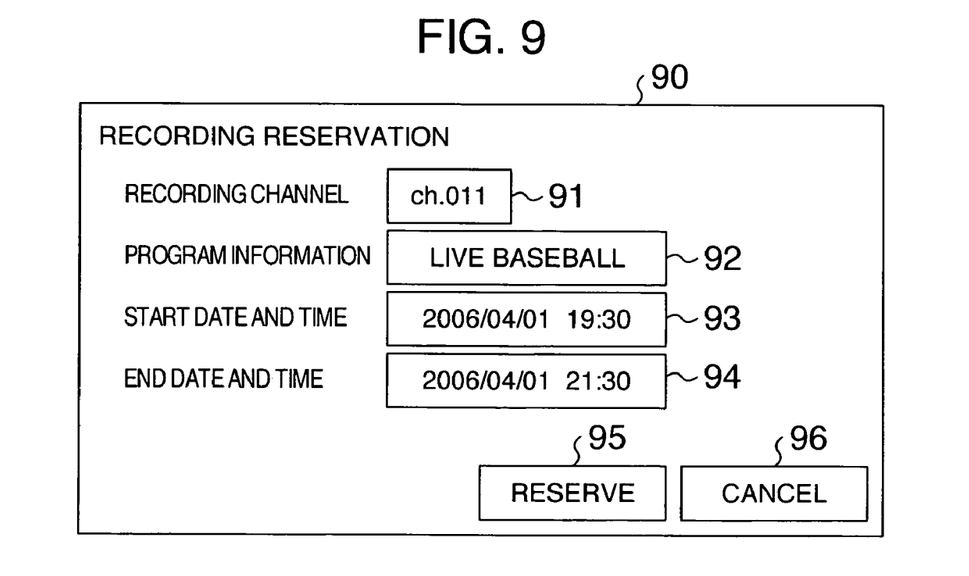
FIG. 9 is a diagram which illustrates a display method during a recording reservation operation.

FIG. 9 is an embodiment of a registration screen for a recording reservation. Reference numeral 90 denotes the recording reservation registration screen, reference numeral 91 denotes a recording channel, reference numeral 92 denotes program information, reference numeral 93 denotes a start date and time, reference numeral 94 denotes an end date and time, reference numeral 95 denotes a reserve button, and reference numeral 96 denotes a cancel button.

A user selects any position on the electronic program list 81 shown in FIG. 8 using an up button 26, a down button 27, a left button 28, a right button 29, and a set button 20 of the remote control 21 of FIG. 3 to select program information in the electronic program list 81 and pushes the set button 20, thereby displaying the recording reservation registration screen 90 of FIG. 9. In the recording reservation registration screen 90, the recording channel 91, the program information 92, the start date and time 93, and the end date and time 94 of the selected program are displayed. When the user pushes the reserve 95, the recording reservation is registered and added to the recording reservation information 44 of FIG. 4. As with the extraction of selection information according to a station selection operation of a tuner as previously described with reference to FIG. 5, selection information 41 is extracted from the electronic program list information 42 as program selection information according to this recording reservation operation. As a result, selection information 41 can be generated also by a recording reservation operation.

Figure 10:
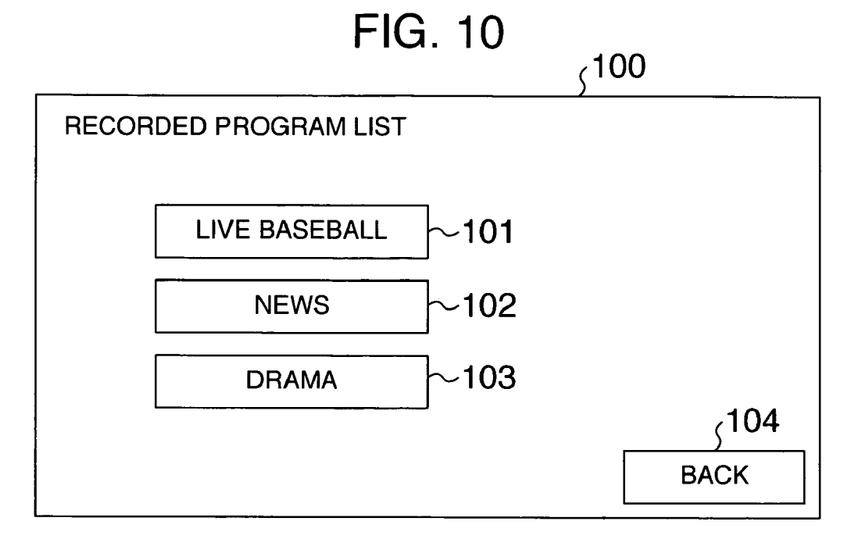
FIG. 10 is a diagram which illustrates a display method of a recorded program list.

FIG. 10 shows a screen which displays a list of recorded programs. Reference numeral 100 denotes the recorded program list, reference numerals 101, 102, and 103 denote recorded programs, and reference numeral 104 denotes a back button. The recorded program list 100 is displayed by a user's operation of the recorded program button 55 on the remote control 21 of FIG. 3. Then, the user selects a recorded program using the up button 26, the down button 27, the left button 28, the right button 29, and the set button 20 of the remote control 21 so that reproduction of the selected recorded program is performed. As with the extraction of selection information according to a station selection operation of a tuner as previously described with reference to FIG. 5, selection information 41 is extracted from the electronic program list information 42 as program selection information according to this recorded program reproduction operation. As a result, selection information 41 can be generated also by a recorded program reproduction operation.

Figure 11:
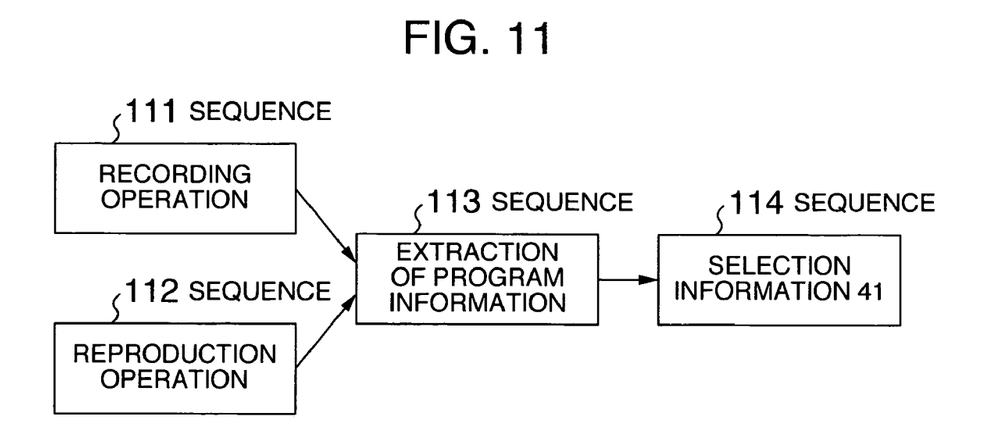
FIG. 11 is a diagram which illustrates an extraction method of selection information by a recording operation or a reproduction operation.

FIG. 11 shows sequences for extraction of selection information 41 in the above description. In operations from sequence 111 to sequence 114, program information is extracted from a recording operation and a reproduction operation, and selection information 41 is generated.

As stated above, the selection information 41 of FIG. 7 can be generated from a station selection operation of a tuner, a recording operation, and a reproduction operation, and the recommended program information 45 is created by the recommended program generation section 13.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video information system which displays or records broadcast video information, comprising:
   a recording section for recording an operation history of the video information system;
   a control section for generating user preference information from the operation history and program information of broadcast video information and selects video information to be displayed or recorded based on the user preference information when the video information is newly reproduced and displayed or newly recorded; and
   a common noun storage section,
   wherein the control section deletes a common noun from program information of broadcast video information with reference to the common noun storage section to obtain user preference information composed of proper nouns, and selects video information to be displayed or recorded based on the user preference information,
   wherein the control section replaces proper noun information in the user preference information with a numeric value which refers to a table of powers of two, and handles the user preference information as a unique numeric value.

2. The video information system according to claim 1, further comprising:
   a broadcast receiving tuner for receiving broadcast video information,
   wherein the recording section comprises a selection information storage section for recording a plurality of channel selection information of the broadcast receiving tuner selected by a user for viewing as the operation history, and an electronic program list information storage section for storing program information of a broadcast program received by the broadcast receiving tuner, and
   wherein the control section generates user preference information from the channel selection information and the program information and selects video information to be displayed or recorded based on the user preference information.

3. The video information system according to claim 2, wherein selection information recorded in the selection information storage section comprises date information, a channel number, and a unique identifier to a viewed program.

4. The video information system according to claim 1, further comprising:
   a broadcast receiving tuner for receiving broadcast video information,
   wherein the recording section comprises a selection information storage section for recording program information of video broadcast information selected by a user for viewing as the operation history, and an electronic program list information storage section for storing program information of a broadcast program received by the broadcast receiving tuner, and
   wherein the control section generates user preference information from the channel selection information and the program information and selects video information to be displayed or recorded based on the user preference information.

5. The video information system according to claim 1, further comprising:
   a broadcast receiving tuner for receiving broadcast video information; and
   a video recording section for recording the broadcast video information received by the broadcast receiving tuner,
   wherein the recording section comprises a selection information storage section for recording, as the operation history, program information of broadcast video information which is set to be reserved to be recorded in the video recording section by a user, and an electronic program list information storage section for storing program information of a broadcast program received by the broadcast receiving tuner, and
   wherein the control section generates user preference information from the channel selection information and the program information, and selects video information to be recorded based on the user preference information.

6. The video information system according to claim 1, further comprising:
   a broadcast receiving tuner for receiving broadcast video information; and a video recording section for recording the broadcast video information received by the broadcast receiving tuner, wherein the recording section comprises a selection information storage section for recording, when a user views the broadcast video information recorded in the video recording section, program information of the viewed broadcast video information as the operation history, and an electronic program list information storage section for storing program information of a broadcast program received by the broadcast receiving tuner, and wherein the control section generates user preference information from the channel selection information and the program information and selects video information to be recorded based on the user preference information.

7. The video information system according to claim 6, wherein selection information recorded in the selection information storage section comprises broadcast date information, a channel number, and a unique identifier to a viewed program.

8. The video information system according to claim 1, comprising
a program list display section for displaying the program information,
wherein the program list display section marks program information identified by the video information selected by the control section and displays the marked program information.

9. The video information system according to claim 1, further comprising:
a broadcast receiving tuner; and
a video display section for displaying a broadcast program received by the broadcast receiving tuner,
wherein the video display section displays a broadcast program identified by the video information selected by the control section at a startup of the video information system.

10. The video information system according to claim 1, further comprising:
a broadcast receiving tuner; and
a video recording section for recording a broadcast program received by the broadcast receiving tuner,
wherein the video recording section automatically records a broadcast program identified by the video information selected by the control section.

11. A video information system which displays broadcast video information, comprising:
a broadcast receiving tuner for receiving broadcast video information;
a selection information storage section for recording program information of broadcast video information selected by a user for viewing as an operation history;
an electronic program list information storage section for storing program information of a broadcast program received by the broadcast receiving tuner;
a recommended program generation section for generating user preference information from the operation history and the program information of the broadcast video information and selecting video information to be displayed based on the user preference informational; and
a common noun storage section,
wherein the recommended program generation section deletes a common noun from program information of broadcast video information with reference to the common noun storage section to obtain user preference information composed of proper nouns, and selects video information to be displayed or recorded based on the user preference information,
wherein the recommended program generation section replaces proper noun information in the user preference information with a numeric value which refers to a table of powers of two, and handles the user preference information as a unique numeric value,
wherein the video information selected by the recommended program generation section is displayed.

12. The video information system according to claim 11, comprising:
a program list display section for displaying the program information,
wherein the program list display section marks program information identified by the video information selected by the recommended program generation section and displays the marked program information.

13. The video information system according to claim 11, comprising:
a video display section for displaying the broadcast program received by the broadcast receiving tuner,
wherein the video display section displays a broadcast program identified by video information selected by the recommended program generation section at startup of the video information system.

14. A method for displaying broadcast video information of a video information system, comprising the steps of:
recording an operation history of display, recording, or the like of broadcast video information;
deleting a common noun from program information of broadcast video information which is displayed or recorded;
generating user preference information from the program information from which the common noun has been deleted and the operation history;
selecting video information to be displayed or recorded based on the user preference information when the video information is newly reproduced and displayed or newly recorded; and
deleting a common noun from program information of broadcast video information with reference to the common noun storage section to obtain user preference information composed of proper nouns, and selecting video information to be displayed or recorded based on the user preference information,
wherein proper noun information in the user preference information is replaced with a numeric value which refers to a table of powers of two, and the user preference information is handled as a unique numeric value.

15. A method for displaying broadcast video information according to claim 14,
wherein the operation history is a plurality of channel selection information of the broadcast receiving tuner selected by a user for viewing, the method further comprising the step of:
marking program information identified by the user preference information and displaying the marked program information when the program information of broadcast video information is displayed.

16. A method for displaying broadcast video information according to claim 14,
wherein the operation history is a plurality of channel selection information of the broadcast receiving tuner selected by a user for viewing, the method further comprising the step of:
displaying a broadcast program identified by program information identified by the user preference information at a startup.

17. A method for displaying broadcast video information according to claim 14,
wherein the operation history is program information of broadcast video information selected by a user for viewing, the method further comprising the step of:
marking program information identified by the user preference information and displaying the marked program information when the program information of broadcast video information is displayed.

18. A method for displaying broadcast video information according to claim 14,
wherein the operation history is program information of broadcast video information selected by a user for viewing, the method further comprising the step of:
displaying a broadcast program identified by program information identified by the user preference information at a startup.

19. A method for displaying broadcast video information according to claim 14,
wherein the operation history is program information of broadcast video information selected by a user for viewing, the method further comprising the step of:
automatically recording a broadcast program identified by video information selected by the user preference information.

20. A method for displaying broadcast video information according to claim 14,
wherein the operation history is program information of broadcast video information which is set to be reserved to be recorded by a user, the method further comprising the step of:
marking program information identified by the user preference information and displaying the marked program information when the program information of broadcast video information is displayed.

21. A method for displaying broadcast video information according to claim 14,
wherein the operation history is program information of broadcast video information which is set to be reserved to be recorded by a user, the method further comprising the step of:
automatically recording a broadcast program identified by video information selected by the user preference information.

22. A method for displaying broadcast video information according to claim 14,
wherein the operation history is program information of broadcast video information which is set to be reserved to be recorded by a user, the method further comprising the step of:
marking program information identified by the user preference information and displaying the marked program information when the program information of broadcast video information is displayed.

* * * * *